United States Patent [19]

Schlüter

[11] Patent Number: 5,697,283

[45] Date of Patent: Dec. 16, 1997

[54] ELECTRONICALLY CONTROLLABLE BRAKE BOOSTER WITH A CABLE FEED-THROUGH

[75] Inventor: Peter Schlüter, Kammerforst, Germany

[73] Assignee: Lucas Industries public limited company, United Kingdom

[21] Appl. No.: 524,332

[22] Filed: Sep. 6, 1995

[30] Foreign Application Priority Data

Sep. 7, 1994 [DE] Germany ............... 44 31 882.0

[51] Int. Cl.$^6$ ................................................ F15B 9/10
[52] U.S. Cl. ...................... 91/369.1; 91/376 R; 92/99
[58] Field of Search ................... 91/369.1, 369.2, 91/376 R; 92/96, 98 R, 98 D, 99

[56] References Cited

U.S. PATENT DOCUMENTS

| | | | |
|---|---|---|---|
| 4,433,614 | 2/1984 | Takeuchi et al. | 91/376 R |
| 4,542,680 | 9/1985 | Takeuchi | 92/99 X |
| 4,617,858 | 10/1986 | Hachiro | 92/99 X |
| 4,800,799 | 1/1989 | Nishii | 91/376 R X |
| 4,944,214 | 7/1990 | Briggs . | |
| 5,193,429 | 3/1993 | Sugiura et al. | 91/376 R X |
| 5,355,770 | 10/1994 | Gautier et al. | 92/98 D X |

*Primary Examiner*—Hoang Nguyen
*Attorney, Agent, or Firm*—Wood, Herron & Evans, L.L.P.

[57] ABSTRACT

For the purpose of routing an electric cable through the movable wall of the two pneumatic working chambers of an electronically controllable bake booster, comprising a first pneumatic working chamber and a second pneumatic working chamber which are separated by a movable wall, where a simple assembly and a high functional reliability are to be ensured, a cable feed-through for at least one electric cable penetrating the movable wall is provided, with a portion of the cable-feed through penetrating the movable wall, and a holder which limits the movability of the cable feed-through at least in its longitudinal direction, and a seal surrounding the cable feed-through in the area of the movable wall.

27 Claims, 1 Drawing Sheet

ELECTRONICALLY CONTROLLABLE BRAKE BOOSTER WITH A CABLE FEED-THROUGH

The present invention relates to an electronically controllable brake booster with a cable feed-through according to the characteristics of the preamble clause of Claim 1, as known from U.S. Pat. No. 4,944,214.

The actuation means in the electronically controllable brake booster are supplied with current or triggering signals, respectively, from an electronic control unit arranged in the engine compartment of the vehicle, and sensors arranged within the brake booster supply signals which are transmitted to the electronic control unit for further processing.

This necessitates extensive cabling between the electronic control unit and the individual consumers or signal sources, respectively, in the brake booster. An arrangement of the cables outside the brake booster is i.a. disadvantageous because the cables must be designed relatively stable and resistant.

On the other hand, a cable routing to the individual consumers or sources through the various working chambers of the brake booster has not been realized yet, not only because the individual passages through the walls of the working chambers must be pneumatically tight, but also because the passage through the movable wall between the two working chambers is relatively complicated, due to the varying pressure ratios between the two working chambers and the movement of the wall between the two working chambers during the operation of the vehicle brake system.

The present invention is therefore based on the problem to route an electric cable through the movable wall between the two pneumatic working chambers of the brake booster, with a simple assembly and a high reliability of the arrangement under operating conditions being ensured.

To solve this problem, the initially described brake booster has been further developed by the characteristics of Claim 1.

With this arrangement, the unexpected effect is obtained that despite the axial movement of the wall between the two working chambers a hermetically sealed passage of the cable from one working chamber into the next is possible, with no (time) losses occurring due to the air flowing along the cable feed-through during the buildup of the pressure difference between the two pneumatic working chambers.

For the purpose of the present invention, the term "electric cable" refers both to a metallic cable as well as to a fibre glass cable for signal transmission.

Because there is a pressure difference between the two pneumatic working chambers, at least during operation, an arrangement of the cable feed-through in such a manner that the holder is housed in the pneumatic working chamber with the higher pressure level ensures that a particularly functionally safe arrangement is provided.

According to an embodiment that can be manufactured particularly easily, the seal is integrally formed with a rolling diaphragm connected with one part of the movable wall.

The seal preferably comprises a web with a material thickness greater than the remaining rolling diaphragm, in order to maintain the portion of the cable feed-through penetrating the movable wall in a defined position, so that movements of the movable wall cannot cause any considerable lateral tension forces via cables branching off the cable feed-through, which might result in a displacement of the cable feed-through in the seal and thus in leakiness of the entire arrangement.

Preferably, the seal is provided with a bead surrounding the holder at least partially, in order to further improve the stable mounting the of cable feed-through. In a preferred embodiment, the bead together with the web, forms a step which at least partially accepts the holder.

In order to achieve a cable routing which is defined to the maximum possible extent and to enable an assembly as simple as possible, the cable feed-through is preferably mounted in a locked rotation preventing position. This can be achieved e.g. by providing a recess in the bead and/or web into which a correspondingly shaped part of the cable feed-through engages.

With the seal engaging the area surrounding the cable feed-through in a sliding fit with its portion penetrating the movable wall, it is relatively simple to assemble the cable feed-through in the seal. In order to provide closely defined sealing conditions it is advantageous if the area surrounding the portion penetrating the movable wall comprises at least a sealing lip. This can reliably enclose the cable feed-through and thus separate the two working chambers hermetically from each other.

To increase the functional safety it is also advantageous to make a fastening element engageable with the portion penetrating the movable wall, so that the cable feed-through is captively connected with the seal.

Preferably, the fastening element and the portion penetrating the movable wall, each has at least one recess or at least one extension engaging the respective recess. The recess and the extension can be so designed that they are interlockable. It is, however, also possible to provide a screw connection or a bayonet locking between the portion penetrating the movable wall and the fastening element. In a preferred embodiment the fastening element in its installed position forces the seal—the recess or the extension, respectively, are interlocked—against the holder.

The portion penetrating the movable wall and/or the holder are preferably formed sleeve shaped and in particular essentially cylindrical. This ensures a particularly tight arrangement.

The cable feed-through comprises at least one connecting pin the two ends of which project beyond a partition arranged in the cable feed-through. Preferably at least one end of the connecting pin is offset backward relative to a face of the portion penetrating the movable wall or the holder, respectively. The ends of the connecting pin are electrically connected with a connecting cable. If the line is designed as a fibre glass cable, then a corresponding cable coupling can be provided here.

The connecting pin (together with the electrically connected connecting cable, if applicable) is preferably embedded in a hermetically curing material.

The electric connection from the first working chamber and the second working chamber between one end of the connecting pin and the connecting cable can be made by soldering, crimping, squeezing or by means of a plug-in connection.

Additional advantages and embodiments will be explained in the following description of the figures with reference to the accompanying drawings, in which.

Figure 1:
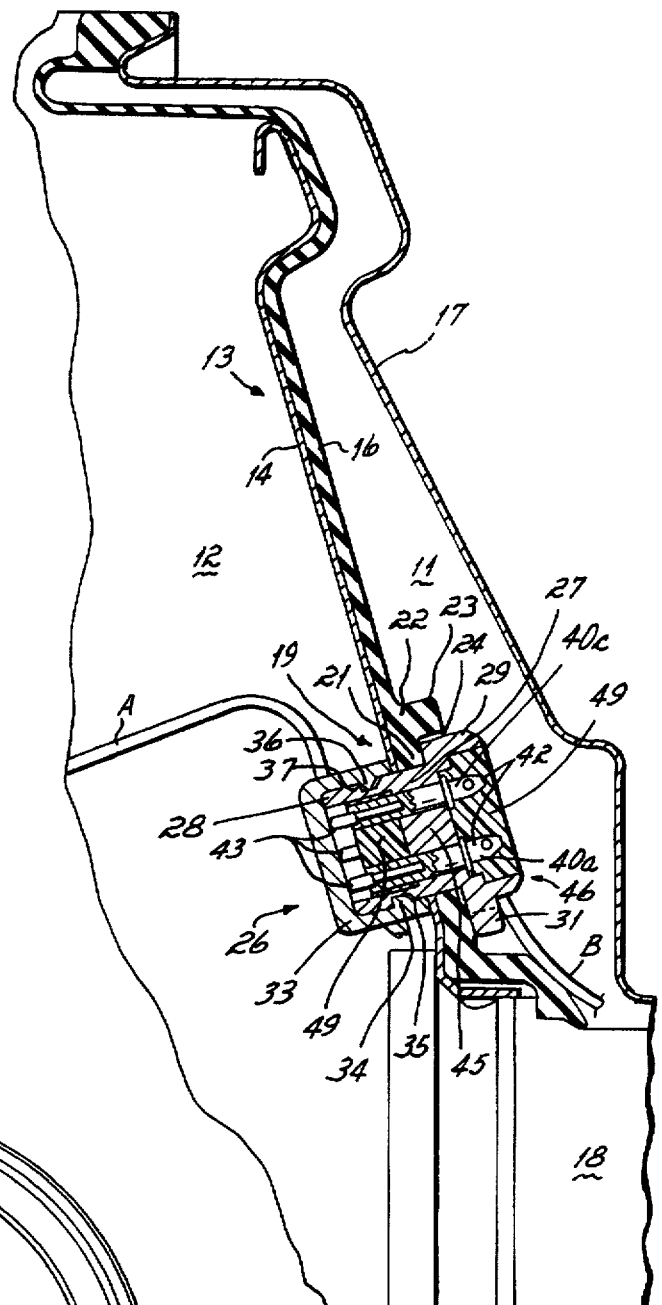
FIG. 1 shows a longitudinal section of a brake booster in a partial view.

FIG. 1 shows a part of an electronically controllable brake booster comprising a first pneumatic working chamber 11 and a second pneumatic working chamber 12 which are separated by a movable wall 13. The movable wall comprises a rigid part 14 in the form of a circular, power transmitting diaphragm disk which is connected with a rolling diaphragm 16 made from a rubber-like material. The rolling diaphragm 16 extends beyond the diaphragm disk along its circumference in a radial direction and is hermetically connected with a housing shell 17, only partially shown. The two parts are connected in the centre of the diaphragm disk 14 and of the rolling diaphragm 16 with a control housing 18 of a control valve arrangement (not shown).

In a radial direction and close to the control housing 18 the diaphragm disk 14 has a circular opening 19 which is aligned with an opening 21 with an essentially identical diameter. In the area surrounding the opening 21 the rolling diaphragm is provided with a web 22 with a material thickness approximately twice that of the remaining rolling diaphragm 16 so that a seal 22 is formed. The side of the seal facing away from the diaphragm disk 14 is provided with a bead 23 with an inner diameter larger than that of the opening 21 so that the web 22 together with the bead 23 forms a step 24.

A cable feed-through generally indicated by 26 has an essentially cylindrical cross sectional shape and comprises a portion 27 which penetrates the movable wall 13 in the area of the opening 19 as well as the web 22 of the seal in the area of the opening 21, a free end 28 of which projects into the second pneumatic working chamber 12. At the opposite end of the portion 27 the cable feed-through 26 comprises a holder 29 which is formed integrally with the portion 27 and has an increased diameter relative to it which is so dimensioned that the holder 29 is accepted in the step 24.

Figure 2:
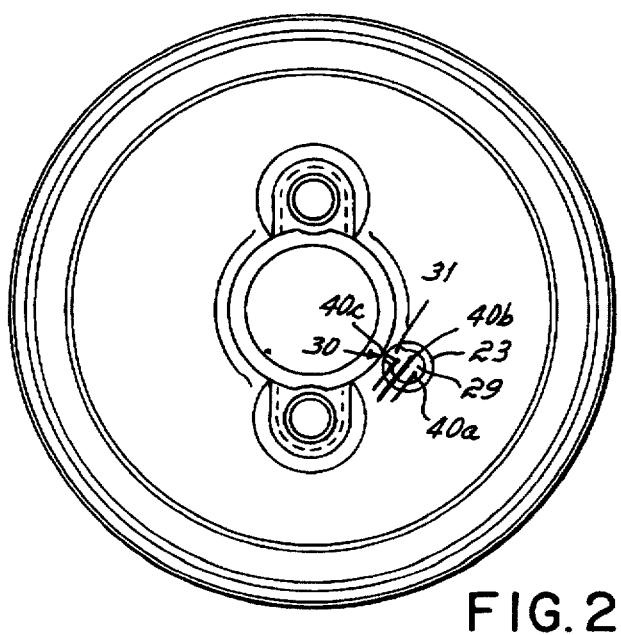
FIG. 2 shows a plan view of a movable wall illustrated in FIG. 1, drawn to a smaller scale.

In order to mount the cable feed-through 26 in the seal 22 in a locked rotation preventing position, the bead 23 is provided with a radial recess with which a radial extension 31 formed at the holder is in a positive engagement (see also FIG. 2).

Figure 3:
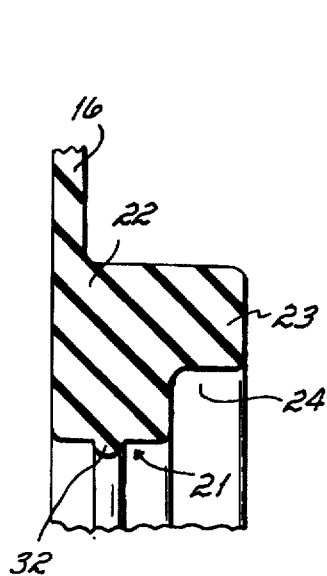
FIG. 3 a seal formed in a rolling diaphragm connected with the movable wall in an enlarged sectional view.

The cable feed-through 26 with its portion 27 penetrating the movable wall 13 is mounted with a sliding fit in the area of the opening 21 surrounding the portion 27. For this purpose, the seal 22 is provided with a circumferential sealing lip 32 in the area of the opening 21 facing the portion 27 (see FIG. 3).

The cable feed-through 26 comprises at its end 28 projecting into the second pneumatic working chamber 12a fastening element in the shape of a cap 33 with an essentially U-shaped longitudinal section. At the inner surface of the cylindrical cap 33 a circumferential projection 34 acting as a lock is provided which engages a recess 35 formed into the outer surface of the cylindrical portion 27. The projection 34 is provided with an inclined ramp 36 and an edge 37 extending rectangularly to the inner wall. The free end 28 of the portion 27 of the cable feed-through 26 is chamfered at its outer surface so that the cap 33 can be pushed over the portion 27 against the diaphragm disk 14 so that the recess 35 and the projection 34 can engage in an interlocking manner. The dimensions of the recess 35 and the projection 34 as well as of the cap 33 and the longitudinal extension of the portion 27 with respect to the holder 29 and the material thickness of the web 22 are so selected that with one embodiment the cable feed-through 26 is accepted with a small axial clearance—limited by the cap 33 and the holder 29—in the opening 19 or 21, respectively, while with a second embodiment the fastening element 33 forces the seal 22 against the holder 29.

In the embodiment shown (see FIG. 2), the cable feed-through 26 comprises three connecting pins 40a, 40b, 40c both ends 42, 43 of each of which project beyond a partition 45 arranged in the cable feed-through. The connecting pins 40a, 40b, 40c are hermetically arranged in the partition, and offset backward at the ends 42 in the holder 29 with respect to the face of the holder 29. At the opposite end the ends 43 of the connecting pins 40a, 40b, 40c practically reach the face of the end 28 of the portion 27.

At its respective both ends 42, 43 each connecting pin 40a, 40b, 40c is connected with one conductor of a cable A, B by means of soldering, crimping, squeezing or a plug-in connection so that an electrical connection from the first working chamber to the second working chamber via the cable feed-through is made.

The respective electrical connection of the conductors of the connecting cable A, B with the ends of the connecting pins 40a, 40b, 40c is embedded in a hermetically curing (synthetic resin) material, which further improves the sealing arrangement.

An essential advantage of the invention is that the seal can be a part of the movable wall, in particular a part of the rolling diaphragm. This means that several functions are integrated by the special design of the rolling diaphragm in the area of the cable feed-through. This enables a particularly simple and cost effective assembly.

What is claimed is:

1. An electronically controllable brake booster with a cable feed-through, comprising:

a first pneumatic working chamber (11) and a second pneumatic working chamber (12) which are separated by a movable wall (13), a cable feed-through (26) penetrating the movable wall (13) for at least one electric cable (A, B), with a portion (27) of the cable feed-through (26) penetrating the movable wall (13), and a holder (29) limiting the movability of the cable feed-through (26) at least in its longitudinal direction, and a seal (22) surrounding the cable feed-through (26) in the area of the movable wall (13), the seal (22) tightly surrounding the portion (27) penetrating the movable wall, the seal (22) including a bead (23) which at least partially surrounds the holder (29).

2. A brake booster according to claim 1, where the bead (23) together with the web (22) forms a step (24) which at least partially accepts the holder (29).

3. A brake booster according to claim 1, where the cable feed-through (26) is mounted in the seal (22) in a locked rotation preventing position.

4. A brake booster according to claim 2, wherein the cable feed-through (26) is mounted in the seal (22) in a locked rotation preventing position, and where one of the bead (23) and the web (22) includes a recess (30) into which a correspondingly shaped part (31) of the cable feed-through (26) engages.

5. A brake booster according to claim 1, where the seal (22) with its area (21) surrounding the portion (27) penetrating the movable wall (13) surrounds the cable feed-through (26) in a sliding fit.

6. A brake booster according to claim 5, where the area (21) of the seal (22) surrounding the portion (27) penetrating the movable wall (13) comprises at least one sealing lip (32).

7. A brake booster according to claim 1, where a fastening element (33) can be brought in engagement with the portion (27) penetrating the movable wall (13), which captively connects the cable feed-through (26) with the seal (22).

8. A brake booster according to claim 7, where a fastening element (33) and the portion (27) penetrating the movable wall (13) each comprise at least one recess (35) or at least one projection (34), respectively, engaging the respective recess (35).

9. A brake booster according to claim 1, further comprising a fastening element (33) which can be brought in engagement with the portion (27) penetrating the movable wall (13), and where the fastening element (33) surrounds the portion (27) penetrating the movable wall (13) and the recess (35) and the projection (34), respectively, can be interlocked.

10. A brake booster according to claim 1, further comprising a fastening element (33) which can be brought in engagement with the portion (27) penetrating the movable wall (13), and where the fastening element (33) forces the seal (22) against the holder (29).

11. A brake booster according to claim 1, where at least one of the portion (27) penetrating the movable wall (13) and the holder (29) is sleeve shaped.

12. A brake booster according to claim 1, where the cable feed-through (26) comprises at least one connecting pin (40a, 40b, 40c) the two ends (42, 43) of which project beyond a partition (45) arranged in the cable feed-through (26).

13. A brake booster according to claim 12, where at least one end (42) of the connecting pin (40a, 40b, 40c) is offset backward relative to a face of the portion (27) penetrating the movable wall (13) or the holder (29), respectively.

14. A brake booster according to claim 12, where at least one end (42, 43) of the connecting pin (40a, 40b, 40c) is electrically connected with a connecting cable (A, B).

15. A brake booster according to claim 12, where at least one end (42, 43) of the connecting pin (40a, 40b, 40c) is embedded in a hermetically curing material (49).

16. A brake booster according to claim 15, where the electrical connection from the first working chamber (11) to the second working chamber (12) is made between one end (42, 43) of the connecting pin (40a, 40b, 40c) and the connecting cable (A, B) by means of soldering, crimping, squeezing, or a plug-in connection.

17. An electronically controllable brake booster with a cable feed-through, comprising:
 a first pneumatic working chamber (11) and a second pneumatic working chamber (12) which are separated by a movable wall (13),
 a cable feed-through (26) penetrating the movable wall (13) for at least one electric cable (A, B), with a portion (27) of the cable feed-through (26) penetrating the movable wall (13), and
 a holder (29) limiting the movability of the cable feed-through (26) at least in its longitudinal direction, and
 a seal (22) surrounding the cable feed-through (26) in the area of the movable wall (13), the seal (22) tightly surrounding the portion (27) penetrating the movable wall, the seal (22) being formed integrally with a rolling diaphragm (16) connected with a rigid part (14) of the movable wall (13), the cable feed-through (26) being mounted in the seal (22) in a locked rotation preventing position.

18. An electronically controllable brake booster with a cable feed-through, comprising:
 a first pneumatic working chamber (11) and a second pneumatic working chamber (12) which are separated by a movable wall (13),
 a cable feed-through (26) penetrating the movable wall (13) for at least one electric cable (A, B), with a portion (27) of the cable feed-through (26) penetrating the movable wall (13),
 a holder (29) limiting the movability of the cable feed-through (26) at least in its longitudinal direction,
 a seal (22) surrounding the cable feed-through (26) in the area of the movable wall (13), the seal (22) tightly surrounding the portion (27) penetrating the movable wall, the seal (22) being formed integrally with a rolling diaphragm (16) connected with a rigid part (14) of the movable wall (13), and
 a fastening element (33) which can be brought in engagement with the portion (27) penetrating the movable wall (13) to captively connect the cable feed-through (26) with the seal (22).

19. A brake booster according to claim 18, where the fastening element (33) and the portion (27) penetrating the movable wall (13) each comprise at least one recess (35) or at least one projection (34), respectively, engaging the respective recess (35).

20. A brake booster according to claim 19, where the fastening element (33) surrounds the portion (27) penetrating the movable wall (13) and the recess (35) and the projection (34), respectively, can be interlocked.

21. A brake booster according to claim 19, where the fastening element (33) forces the seal (22) against the holder (29).

22. An electronically controllable brake booster with a cable feed-through, comprising:
 a first pneumatic working chamber (11) and a second pneumatic working chamber (12) which are separated by a movable wall (13),
 a cable feed-through (26) penetrating the movable wall (13) for at least one electric cable (A, B), with a portion (27) of the cable feed-through (26) penetrating the movable wall (13),
 a holder (29) limiting the movability of the cable feed-through (26) at least in its longitudinal direction,
 a seal (22) surrounding the cable feed-through (26) in the area of the movable wall (13), the seal (22) tightly surrounding the portion (27) penetrating the movable wall, the seal (22) being formed integrally with a rolling diaphragm (16) connected with a rigid part (14) of the movable wall (13), and
 where the cable feed-through (26) comprises at least one connecting pin (40a, 40b, 40c) the two ends (42, 43) of which project beyond a partition (45) arranged in the cable feed-through (26).

23. A brake booster according to claim 22, where at least one end (42) of the connecting pin (40a, 40b, 40c) is offset backward relative to a face of the portion (27) penetrating the movable wall (13) or the holder (29), respectively.

24. A brake booster according to claim 22, where at least one end (42, 43) of the connecting pin (40a, 40b, 40c) is electrically connected with a connecting cable (A, B).

25. A brake booster according to claim 22, where at least one end (42, 43) of the connecting pin (40a, 40b, 40c) is embedded in a hermetically curing material (49).

26. A brake booster according to claim 22, where the electrical connection from the first working chamber (11) to the second working chamber (12) is made between one end (42, 43) of the connecting pin (40a, 40b, 40c) and the connecting cable (A, B) by one of the means of soldering, crimping, squeezing, and a plug-in connection.

27. A brake booster according to claim 1, where the portion (27) penetrating the movable wall (13) is in contact with the holder (29).

* * * * *